US009501332B2

(12) United States Patent
Vantrease et al.

(10) Patent No.: US 9,501,332 B2
(45) Date of Patent: Nov. 22, 2016

(54) SYSTEM AND METHOD TO RESET A LOCK INDICATION

(71) Applicant: QUALCOMM Incorporated, San Diego, CA (US)

(72) Inventors: Dana M. Vantrease, Austin, TX (US); Christopher E. Koob, Round Rock, TX (US); Erich J. Plondke, Austin, TX (US)

(73) Assignee: QUALCOMM Incorporated, San Diego, CA (US)

(*) Notice: Subject to any disclaimer, the term of this patent is extended or adjusted under 35 U.S.C. 154(b) by 625 days.

(21) Appl. No.: 13/721,229

(22) Filed: Dec. 20, 2012

(65) Prior Publication Data

US 2014/0181341 A1 Jun. 26, 2014

(51) Int. Cl.

*G06F 9/52* (2006.01)
*G06F 12/08* (2016.01)
*G06F 9/30* (2006.01)

(52) U.S. Cl.

CPC ............... *G06F 9/52* (2013.01); *G06F 9/3004* (2013.01); *G06F 9/30087* (2013.01); *G06F 12/0864* (2013.01); *G06F 2212/6082* (2013.01); *Y02B 60/1225* (2013.01)

(58) Field of Classification Search

CPC .... G06F 9/52; G06F 9/526; G06F 2201/825; G06F 2201/2147; Y10S 707/99938

USPC .......................................................... 710/200

See application file for complete search history.

(56) References Cited

U.S. PATENT DOCUMENTS 5,163,144 A * 11/1992 Ikeno ............................ 711/152
5,669,002 A * 9/1997 Buch ......................... G06F 9/52 709/213
5,774,731 A * 6/1998 Higuchi .................... G06F 9/52 710/200
5,860,126 A * 1/1999 Mittal ........................... 711/167
6,092,159 A * 7/2000 Ekner et al. .................. 711/152
6,463,511 B2 * 10/2002 Boatright et al. ............ 711/145
6,782,440 B2 * 8/2004 Miller ...................... G06F 8/457 707/999.008
6,823,471 B1 * 11/2004 Arimilli et al. ................. 714/10
6,986,005 B2 * 1/2006 Vo ................................ 711/152
7,155,588 B1 12/2006 Jeter, Jr.

(Continued)

FOREIGN PATENT DOCUMENTS

EP 343343 A2 * 11/1989
EP 1343343 A1 9/2003

(Continued)

OTHER PUBLICATIONS

"Tanenbaum—Hardware/Software Tradeoffs: A General Design Principle" 3 pages, Dated Jan. 25, 1985.*

(Continued)

*Primary Examiner* — Brian Misiura
(74) *Attorney, Agent, or Firm* — Peter Michael Karmarchik; Kenneth Vu

(57) ABSTRACT

An apparatus include a first core processor, a second core processor, and a lock register coupled to the first core processor and to the second core processor. The apparatus further includes a shared structure responsive to the first core processor and to the second core processor. The shared structure is responsive to an unlock instruction issued by either the first core processor or the second core processor to send a signal to the lock register to reset a lock indication in the lock register.

23 Claims, 4 Drawing Sheets

(56) References Cited

U.S. PATENT DOCUMENTS

| | | | | |
|---|---|---|---|---|
| 7,349,909 | B2 * | 3/2008 | Wu et al. | |
| 7,350,117 | B2 * | 3/2008 | Garcia | G06F 9/526 714/55 |
| 7,406,690 | B2 * | 7/2008 | Jenkins et al. | 718/104 |
| 7,409,506 | B2 * | 8/2008 | Kamigata et al. | 711/151 |
| 7,634,629 | B2 * | 12/2009 | Nemiroff et al. | 711/163 |
| 7,895,431 | B2 * | 2/2011 | Bouchard et al. | 713/152 |
| 8,140,823 | B2 * | 3/2012 | Codrescu et al. | 711/207 |
| 8,578,104 | B2 * | 11/2013 | Hoogerbrugge et al. | 711/143 |
| 8,645,650 | B2 * | 2/2014 | Brassow | 711/163 |
| 9,009,715 | B2 * | 4/2015 | Ogasawara | 718/103 |
| 2007/0271450 | A1 | 11/2007 | Doshi et al. | |
| 2008/0270723 | A1 * | 10/2008 | Ueda | 711/163 |
| 2008/0288691 | A1 | 11/2008 | Bie et al. | |
| 2011/0161540 | A1 | 6/2011 | Chang et al. | |
| 2011/0296113 | A1 | 12/2011 | Elnozahy | |
| 2013/0290286 | A1 * | 10/2013 | Su et al. | 707/704 |

FOREIGN PATENT DOCUMENTS

| | | | |
|---|---|---|---|
| WO | 9827464 | A1 | 6/1998 |
| WO | 2009153703 | A1 | 12/2009 |

OTHER PUBLICATIONS

Texas Instruments, "KeyStone Architecture Multicore Shared Memory Controller (MSMC) User Guide" Oct. 2011, pp. 1-59.

International Search Report and Written Opinion—PCT/US2013/077011, International Search Authority—European Patent Office, Mar. 14, 2014.

"System Support for Multiprocessing Without an Atomic Storage, IBM Technical Disclosure Bulletin, International Business Machines Corp. (THORNW00D), US, vol. 33, No. 9, Feb. 1, 1991, pp. 18-23", XP000119746, ISSN: 0018-8689 p. 18 p. 22-p. 23.

* cited by examiner 442
422
432
456
INSTRUCTIONS
SYSTEM MEMORY
WIRELESS INTERFACE
440
444
POWER SUPPLY
430
INPUT DEVICE
410
PROCESSOR
106
SECOND CORE
112
REGISTER
102
FIRST CORE
SHARED STRUCTURE
110
428
DISPLAY
426
DISPLAY CONTROLLER
434
CODEC
436
SPEAKER
438
MICROPHONE
400

SYSTEM AND METHOD TO RESET A LOCK INDICATION

I. FIELD

The present disclosure is generally related to resetting a lock indication.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Additional computing capabilities may be enabled by multi-core processors that are configurable to process instructions associated with memory operations. In multi-core environments, when a shared resource is to be used by one of the cores (e.g., to write data to a shared memory), the core may obtain a "lock" to the shared resource to prevent other cores from accessing the shared resource. When a lock is released by a core processor, programmers may often infer that memory operations preceding the lock release have become visible to other core processors. For example, memory operations may become visible to the other core processors when the memory operations reach a coherence domain (i.e., a region accessible to each core processor in a multi-core environment) that may include a shared memory accessible to each core processor. Thus, a core processor may not release the lock until all memory operations have become visible to all other core processors in the coherence domain. Releasing the lock too early may result in the lock release bypassing the memory operations, potentially causing the other core processors to read stale data values by acquiring the lock before data propagates to the coherence domain. To avoid releasing the lock too early, the core processor may stall the release of the lock; however, stalling the release of the lock degrades performance, consumes power, and may prohibit the core processor from performing other processing functions while the lock release is stalled.

III. SUMMARY

Systems and methods to reset a lock indication are disclosed. A first core processor of a multi-core processor system may acquire a lock from a lock register and perform processing functions (i.e., read and write operations) on data associated with the lock. When the first core processor acquires the lock, a lock indication stored in the lock register may have obit value that indicates a lock state (e.g., indicating the lock has been acquired). When the bit value indicates the lock state, other core processors in the multi-core processor system are prevented from accessing the data associated with the lock. After the first core processor completes the processing functions, the first core processor may release the lock and may send an unlock instruction through a processing pipeline. The unlock instruction indicates that the lock has been released. When the unlock instruction reaches a coherence domain (such as a memory accessible to all of the core processors in the multi-core processor system), a lock reset signal may be provided to the lock register to reset the bit value to indicate an unlock state (e.g., indicating that the lock is available and that all of the data associated with the lock is current). Upon releasing the lock, the first core processor may enter into a sleep mode or may acquire a different lock associated with different data to perform other processing functions on the different data. The first core processor may perform the other processing functions on the different data (or enter into the sleep mode) while other core processors (waiting to perform processing functions on the data associated with the lock) may stall until the data and unlock instruction flow through the processing pipeline to the coherence domain.

In a particular embodiment, an apparatus includes a first core processor, a second core processor, and a lock register coupled to the first core processor and to the second core processor. The apparatus further includes a shared structure responsive to the first core processor and to the second core processor. The shared structure is responsive to an unlock instruction issued by either the first core processor or the second core processor to send a signal to the lock register to reset a lock indication in the lock register.

In another particular embodiment, a method includes receiving an unlock instruction at a first memory device, where the unlock instruction is issued by a first processor. The method further includes sending a signal from the memory device to a data storage device coupled to the first processor to reset a lock state indication stored in the data storage device.

In another particular embodiment, a non-transitory computer readable storage medium comprises instructions that, when executed by a processor, cause the processor to receive an unlock instruction issued by a first core processor at a shared memory of the processor. The non-transitory computer readable storage medium further comprises instructions that, when executed by a processor cause the processor to send a signal to a data storage device coupled to the first core processor to reset a lock state indication stored in the data storage device.

In another particular embodiment, an apparatus comprises means for storing a lock state indication. The apparatus includes means for sending a signal to the means for storing responsive to receiving an unlock instruction, wherein the lock state indication stored in the means for storing is reset based on the signal. The apparatus further includes means for releasing the lock and means for performing other processing functions upon release of the lock and prior to the lock indication being reset. The unlock instruction is issued to the means for sending after the lock is released.

One particular advantage provided by at least one of the disclosed embodiments is an ability for a core processor within a multi-core environment to perform functions on additional data after sending an unlock instruction to a coherence domain associated with other core processors which releases a lock associated with a first set of data on which processing functions were performed. The core processor may perform the functions on the additional data prior to the first set of data and the unlock instruction reaching the coherence domain which may reduce or eliminate a stall of the core processor while the first set of data and the unlock instruction are in transit to the coherence domain. Reducing the stall of the core processor may improve system performance. Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
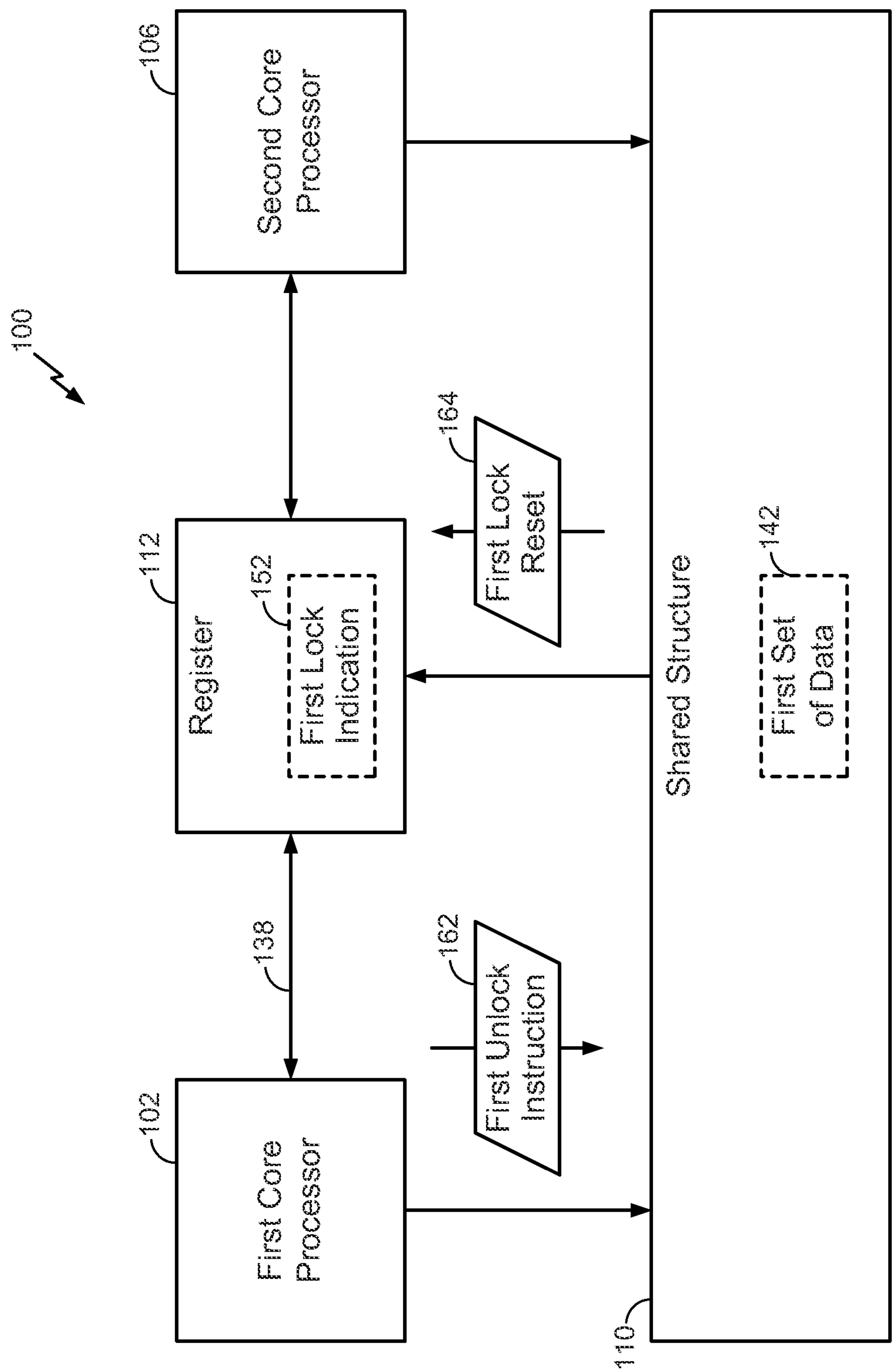
FIG. 1 is a block diagram of a particular illustrative embodiment of a multi-core processor system that is operable to reset a lock indication.

Referring to FIG. 1, a particular illustrative embodiment of a multi-core processor system 100 that is operable to reset a lock indication is shown. The system 100 includes a first core processor 102, a second core processor 106, a shared structure 110, and a data storage device illustrated as a register 112 (a lock register). The first core processor 102 is coupled to the register 112 and to the shared structure 110. The second core processor 106 is coupled to the register 112 and to the shared structure 110. The register 112 is coupled to the shared structure 110. Although a dual-core processor system is illustrated, in alternate embodiments, the system 100 may include additional core processors coupled to the register 112. For example, the system 100 may include a plurality of core processors that include the first and second core processors 102, 106.

The first core processor 102 and the second core processor 106 may be configurable to perform processing functions on a common set of data. For example, the first core processor 102 may be configured to perform a first processing function a first read and/or write operation) on a first set of data 142 that is stored in a first memory location of the shared structure 110. The second core processor 106 may be configured to perform a second processing function (i.e., a second read and/or write operation) on the first set of data 142 after the first core processor 102 completes the first processing function.

The register 112 is configured to store a first lock that is associated with the first set of data 142. The first lock may be a register-based lock (i.e., addressable by an instruction provided to the register 112), and the first set of data 142 may be memory addressable (i.e., addressable by a memory location in the shared structure 110). The register 112 is further configured to store a first lock indication 152 (e.g., a first bit value) that corresponds to a state of the first lock and to designate a state of a memory address of the first set of data 142. For example, if the first lock has been acquired by one of the core processors 102, 106, the first lock indication 152 may correspond to a "lock" state and designate the memory address of the first set of data 142 as being inaccessible. When the first lock indication 152 corresponds to the lock state, other core processors in the system 100 may not acquire the first lock and thus may not perform processing functions on values corresponding to the first set of data 142. If neither of the processor cores 102, 106 has acquired the first lock, the first lock indication 152 may correspond to an "unlock" state. When the first lock indication 152 corresponds to the unlock state, either the first or the second core processor 102, 106 may acquire the first lock from the register 112.

The first core processor 102 is configured to send an inquiry to the register 112 to determine whether processing functions are being performed on values associated with the first set of data 142. For example, the first core processor 102 may send an inquiry to the register 112 to determine a state of the first lock indication 152. The inquiry may be sent by sending a read command to the register 112 to read a value (e.g., a single bit value or a multiple-bit value such as a two-bit value) that indicates the state of the first lock indication 152. In response to a determination that the first lock indication 152 corresponds to an unlock state, the first core processor 102 is configured to acquire the first lock from the register 112 via a lock path 138. For example, the first core processor 102 may acquire the first lock from the register 112 by sending a first instruction to the register 112 via the lock path 138. In response to receiving the instruction, the register 112 may set the first lock indication 152 to a value that indicates that the first lock has been acquired by the first core processor 102. The register 112 may be an instruction-based register that operates at a greater speed than a memory device, such as the shared structure 110. The first core processor 102 is farther configured to begin performing the first processing function on the first set of data 142 (i.e., modify the first set of data 142). As explained with respect to FIG. 2, the modified first set of data may be written to a first data cache and then to the first memory location 142 of the shared structure 110 via a first bus queue.

After completing the first processing function on the first set of data 142, the first core processor 102 is further configured to release the first lock by generating a first unlock instruction 162 and by sending the first unlock instruction 162 to the shared structure 110. The first unlock instruction 162 may be configurable as a barrier (i.e., a special instruction or command indicating that the first core processor 102 has completed the first processing function on the first set of data 142 or processing functions associated with the first lock indication 152). For example, the first unlock instruction 162 may travel through a processing pipeline subsequent to all preceding memory operations corresponding to the first processing function so the first unlock instruction 162 reaches the shared structure 110 after the preceding memory operations reach the shared structure 110. The first unlock instruction 162 may operate to synchronize operations of the core processors 102, 106. For example, when the first unlock instruction 162 reaches a coherence domain (i.e., the shared structure 110) associated with the core processors 102, 106, the first unlock instruction 162 may signal to the core processors 102, 106 that all of the values corresponding to the first set of data 142 are current.

The second core processor 106 is configured to operate in a similar manner as the first core processor 102. For example, the second core processor 106 is configured to send an inquiry to the register 112 to determine the state of the first lock indication 152 and to acquire the first lock from the register 112 in response to a determination that the first lock indication 152 corresponds to an unlock state. The second core processor 106 is further configured to perform the second processing function on the first set of data 142. After completing the second processing function, the second core processor 106 is configured to release the first lock by generating an unlock instruction and sending the unlock instruction to the shared structure 110.

The shared structure 110 is configured to receive the first unlock instruction 162 and to generate a first lock reset signal 164 in response to receiving the first unlock instruction 162. In a particular embodiment, the shared structure 110 is configured to receive the first unlock instruction 162 after receiving the modified data corresponding to the first set of data 142. The shared structure 110 is further configured to send the first lock reset signal 164 to the register 112. Upon receiving the first lock reset signal 164, the register 112 is configured to reset the first lock indication 152. Resetting the first lock indication 152 may include changing the bit value associated with the first lock indication 152 to correspond to the unlock state. The shared structure 110 may include a shared memory, a memory bus, a system bus, or any combination thereof. In a particular embodiment, the shared structure 110 may be a level-two cache accessible to the first and second core processors 102, 106 via a memory bus. As explained with respect to FIG. 2, the first set of data 142 may be stored at the level-two cache, a level-one cache accessible by a single processor core, or any combination thereof.

During operation, the first core processor 102 may acquire the first lock to the first set of data 142 and set the first lock indication 152 at the register 112. As a result, the register 112 stores a bit value corresponding to the lock state as the first lock indication 152, indicating to the second core processor 106 (and any other processing units) that the first set of data 142 is undergoing processing and is not available. The first core processor 102 may perform the first processing function on the first set of data 142 and release the lock (i.e., generate and send the first unlock instruction 162 to the shared structure 110) after the first processing function is completed. The first core processor 102 may perform other processing functions (i.e., perform processing functions on another set of data) or enter into a sleep mode after releasing the first lock and prior to the shared structure 110 receiving the first unlock instruction 162. For example, the first core processor 102 may perform other processing functions while the second core processor 106 (and other core processors waiting to perform processing functions on the first set of data 142) is stalled from initiating processing functions on the first set of data 142. As explained with respect to FIG. 2, the first core processor 102 may perform the other processing functions by acquiring another lock from the register 112 associated with another set of data. Performing other processing functions on the other set of data prior to the first set of data 142 and the first unlock instruction 162 reaching the shared structure 110 may reduce or eliminate a stall of the first core processor 102 while the first set of data 142 and the unlock instruction 162 are in transit to the shared structure 110. Reducing the stall of the first core processor 102 may improve system performance.

In an alternate embodiment, the first core processor 102 may send a reserve signal to the register 112 in response to releasing the first lock, resulting in the first lock indication 152 corresponding to a "reserve" state. When the first lock indication 152 corresponds to the "reserve" state, core processors in the system 100 may not acquire the first lock or perform processing functions on values corresponding to the first set of data 142. For example, when the first lock indication 152 corresponds to the "reserve" state, the second core processor 106 may not acquire the first lock or perform processing functions on values corresponding to the first set of data 142. The "reserve" state indicates to other core processors that the first core processor 102 will re-acquire the first lock to perform additional processing functions on the first set of data 142. When first lock reset signal 164 reaches the register 112, the first core processor 102 may re-acquire the first lock to perform additional processing functions on the first set of data 142. The "reserve" state may prevent other core processors (i.e., the second core processor 106) from acquiring the first lock upon the register 112 receiving the first lock reset signal 164. The reserve state may indicate that the first core processor 102, which had previously acquired the first lock, has released the first lock and memory operations performed on the first set of data 142 are in progress.

It will be appreciated that the system 100 of FIG. 1 may enable the first core processor 102 to release the first lock prior to all memory operations associated with the first set of data 142 becoming visible in a coherence domain (i.e., the shared structure 110). For example, the first core processor 102 may release the first lock prior to modified data values that correspond to first set of data 142 reaching the shared structure 110 and prior to the bit value of the first lock indication 152 changing to indicate the "unlock" state. Thus, the first core processor 102 may perform additional processing functions or may enter into a sleep mode after performing the memory operations associated with the first set of data 142 and before the memory operations associated with the first set of data 142 are visible to the other core processors (i.e., the second core processor 106) in the coherence domain. Power may be saved when the first core processor 102 enters the sleep mode and performance of the system 100 may be enhanced by reducing and/or eliminating a stall associated with the first core processor 102 while the memory operations associated with the first set of data 142 (i.e., modified data values corresponding to the first set of data 142) are propagated through the processing pipeline to the shared structure 110.

Figure 2:
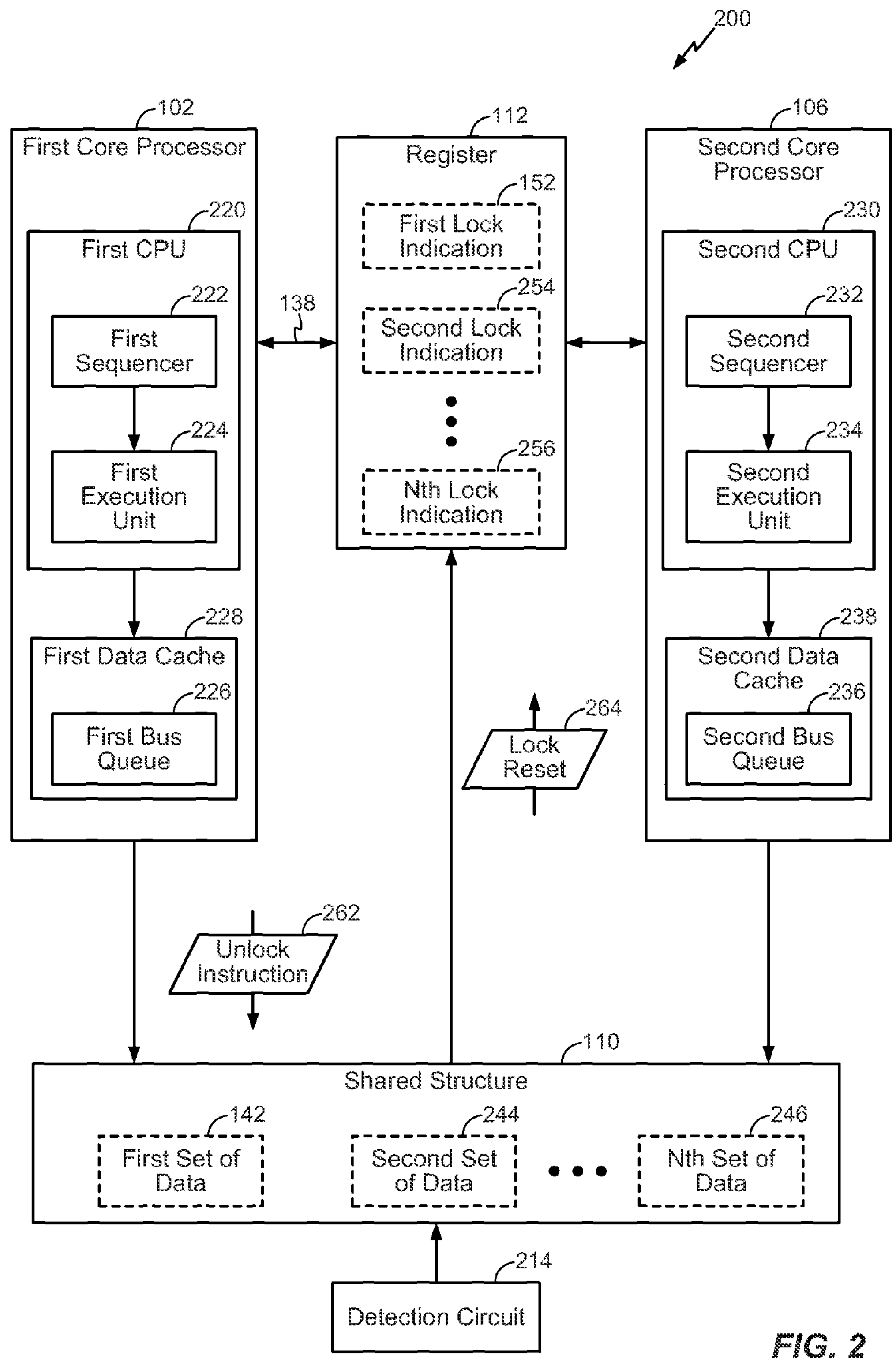
FIG. 2 is a block diagram of another particular illustrative embodiment of a multi-core processor system that is operable to reset a lock indication.

Referring to FIG. 2, a particular illustrative embodiment of a multi-core processor system 200 that is operable to reset a lock indication is shown. The system 200 includes the first core processor 102, the second core processor 106, the shared structure 110, the register 112, and a detection circuit 214. The first core processor 102 is coupled to the register 112 and to the shared structure 110. The second core processor 106 is coupled to the register 112 and to the shared structure 110. The shared structure 110 is further coupled to the register 112. Although a dual-core processor system is illustrated, in alternate embodiments, the system 200 may include additional core processors coupled to the register 112.

The register 112 is configured to store the first lock, a second lock, and an Nth lock, where N is any integer greater than two. For example, if N=5, the register 112 is configured to store five locks. The register 112 is further configured to store the first lock indication 152 (e.g., the first bit value) that corresponds to a state of the first lock, a second lock indication 254 (e.g., a second bit value) that corresponds to a state of the second lock, and an Nth lock indication 256 (e.g., an Nth bit value) that corresponds to a state of the Nth lock. The second lock (and the second lock indication 254) may be associated with a second set of data 244 in a second memory location of the shared structure 110, and the Nth lock (and the Nth lock indication 256) may be associated with an Nth set of data 246 in an Nth location of the shared structure 110. In a similar manner as the first lock indication 152, the second and the Nth lock indications 254, 256 may each correspond to a lock state, an unlock state, or a reserve state.

The first core processor 102 includes a first central processing unit (CPU) 220 and a first data cache 228. The first CPU 220 includes a first sequencer 222 coupled to a first execution unit 224, The first data cache 228 includes a first bus queue 226. In a particular embodiment, the first data cache 228 may be a level-one cache. The first data cache 228 is coupled to the first core processor 102 and to the shared structure 110.

In a particular embodiment, the first sequencer 222 is configured to select a set of data to be modified. For example, the first sequencer 222 may select the first set of data 142, the second set of data 244, or the Nth set of data 246. The first CPU 220 is configured to send an inquiry to the register 112 to determine a state of the lock indication corresponding to the selected set of data. For example, if the first sequencer 222 selects the first set of data 142, the first CPU 220 may send an inquiry to the register 112 to determine a state of the first lock indication 152. Alternatively, if the first sequencer 222 selects the second or Nth set of data 244 or 246, the first CPU 220 may send an inquiry to the register 112 to determine a state of the second or Nth lock indication 254 or 256, respectively.

In response to a determination that the lock indication corresponding to the selected set of data corresponds to an unlock state, the first CPU 220 is configured to acquire a lock corresponding to the selected set of data from the register 112. For example, if the first sequencer 222 selects the first set of data 142, the first CPU 220 may acquire the first lock from the register 112. In response to a determination that the lock indication corresponding to the selected set of data corresponds to a lock state or a reserve state, the first CPU 220 may stall (i.e., delay processing functions) until the lock indication is reset. For example, if the first sequencer 222 selects the first set of data 142 and the first lock indication 152 corresponds to a lock or reserve state, the first CPU 220 may stall processing functions related, to the first set of data 142 until the first lock indication 152 is reset.

The first execution unit 224 is configured to perform processing functions on the selected set of data after the first CPU 220 acquires the corresponding lock. For example, the first execution unit 224 may perform the first processing function on the first set of data 142 (e.g., modify data values corresponding to the first set of data 142) after the first CPU 220 acquires the first lock from the register 112. Upon completion of the first processing function, the first execution unit 224 is configured to provide modified data to the first data cache 228 and to release the first lock by generating an unlock instruction 262. The unlock instruction 262 may be configurable as a barrier (i.e., a special instruction or command indicating that the first execution unit 224 has completed the first processing function on the first set of data 142) and may be provided to the first data cache 228. The unlock instruction 262 may travel through a processing pipeline subsequent to all preceding memory operations corresponding to the first processing function (i.e., following the modified data values corresponding to the first set of data 142). The first data cache 228 is configured to send the modified set of data to the shared structure 110 and to subsequently send the unlock instruction 262 to the shared structure 110 according to first bus queue 226. For example, the first data cache 228 may be a level-one cache operating in a write-through mode and the shared structure 110 may be a level-two cache that is shared by the first and second core processors 102, 106. Upon the first CPU 220 performing a data store operation at the first data cache 228, followed by issuing the unlock instruction 262, the first data cache 228 may send the modified set of data and the unlock instruction 262 to the shared structure 110 in a same order that the modified set of data and the unlock instruction 262 are received from the first execution unit 224. In a particular embodiment, the first bus queue 226 may fetch and send modified data values (corresponding to the first set of data 142) and the unlock instruction 262 to the shared structure 110 in the order the first data cache 228 receives the modified data values and the unlock instruction 262 from the first execution unit 224 so that the write-through of modified data is completed at the shared structure 110 prior to unlocking the data for access by other core processors in the multi-core processor system 200.

In a particular embodiment, the unlock instruction 262 corresponds to the first unlock instruction 162 of FIG. 1. For example, when the first sequencer 222 selects the first set of data 142 and the first CPU 220 acquires the first lock, the unlock instruction 262 may correspond to the first lock as described with respect to FIG. 1. In another embodiment, the unlock instruction 262 may correspond to a second or an Nth unlock instruction. For example, when the first sequencer 222 selects the second or the Nth set of data 244 or 246, the unlock instruction 262 may correspond to the second or the Nth lock, respectively.

The second core processor 106 includes a second CPU 230 and a second data cache 238. The second CPU 230 includes a second sequencer 232 coupled to a second execution unit 234. The second data cache 238 includes a second bus queue 236. In a particular embodiment, the second data cache 238 is a level-one cache. The second data cache 238 is coupled to the second core processor 106 and to the shared structure 110. The components of the second core processor 106 are configured to work in a similar manner as the components of the first core processor 102 with respect to performing a second processing function on a selected set of data 142, 244, or 246.

The detection circuit 214 is configured to recognize or detect the unlock instruction 262 received by the shared structure 110. For example, the detection circuit 214 may include a decoder configured to detect the unlock instruction 262 received by the shared structure 110 due to one or more identifiable characteristics of the unlock instruction 262. The shared structure 110 is configured to receive the unlock instruction 262 and to generate a lock reset signal 264 in response to the detecting circuit 214 detecting the unlock instruction 262. In a particular embodiment, the lock reset signal 264 corresponds to the first lock. For example, when unlock instruction 262 corresponds to the first lock, the lock reset signal 264 corresponds to the first lock reset signal 164 of FIG. 1. In another embodiment, the unlock instruction 262 may correspond to a second or an Nth unlock instruction. For example, when the unlock instruction 262 corresponds to the second or Nth lock, the lock reset signal 264 may correspond to the second or the Nth lock, respectively. The shared structure 110 is farther configured to send the lock reset signal 264 to the register 112. Upon receiving the lock reset signal 264, the register 112 is configured to reset the corresponding lock indication 152, 254, or 256. For example, if the lock reset signal 264 corresponds to the first lock, the register 12 may change the bit value associated with the first lock indication 152 to correspond to the unlock state. Alternatively, if the lock reset signal 264 corresponds to the second or Nth lock, the register 112 may change the bit value associated with the second or Nth lock indication 254 or 256, respectively.

During operation, the first CPU 220 may acquire the first lock to the first set of data 142 and set the first lock indication 152 at the register 122. As a result, the register 112 stores a bit value corresponding to the lock state as the first lock indication 152, indicating to the second core processor 106 that the first set of data 142 is undergoing processing and is not available. The second core processor 106 may be prohibited (e.g., stalled) from performing processing functions on the first set of data 142 until the first lock indication 152 is reset (e.g., changed to an unlock state). Prohibiting the second core processor 106 from performing processing functions on the first set of data 142 while the first lock indication 152 corresponds to the lock state may prevent the second core processor 106 from reading stale data values associated with the first set of data 142.

The first execution unit 224 may perform processing functions on first set of data 142 (e.g., modify the first set of data 142) and release the first lock after completing the processing functions. The processing functions may include read operations, write operations, shift operations, add operations, subtract operations, AND operations, OR operations, XOR operations, any combination thereof or other processing functions known to those having skill in the art. The first execution unit 224 may generate the unlock instruction 262 and may send the unlock instruction 262 to the first data cache 228 to travel through a processing pipeline to the shared structure 112 following the modified data (i.e., after the first data cache 228 sends the modified data to the shared structure 110). Thus, the shared structure 112 may receive the unlock instruction 262 after previously stored data (i.e., the modified data stored in the first data cache 228) of the first core processor 102 has been received by the shared structure 112. In response to releasing the first lock and prior to the unlock instruction 262 reaching the shared structure 112, the first core processor 102 may enter into a sleep state or perform other processing functions. For example, the first sequencer 222 may select the second or Nth set of data 244 or 246, the first CPU 220 may acquire the second or Nth lock conditioned on the second or Nth lock indication 254 or 256 corresponding to an unlock state, and the first execution unit 224 may perform processing functions on the selected set of data 244 or 246 prior to the unlock instruction 262 reaching the shared structure 112.

The detection circuit 214 may detect the unlock instruction 262 upon the unlock instruction 262 reaching the shared structure 112. In response to detecting the unlock instruction 262, the shared structure 112 may send the lock reset signal 264 (i.e., the first lock reset signal 164) to the register 112. The register 112 may change the first lock indication 152 to correspond to an unlock state upon receiving the lock reset signal 264. In response to the first lock indication 152 corresponding to the unlock state, the second core processor 106 may exit the stalled state, acquire the first lock from the register 112, and begin performing processing functions on the first set of data 142.

It will be appreciated that system 200 of FIG. 2 may enhance efficiency and performance by permitting the first core processor 102 to perform processing functions on data (i.e., the second or Nth set of data 244 or 246) after sending an unlock instruction to release the first lock and prior to the modified first set of data 142 reaching the point of coherency (i.e., the shared structure 110).

Figure 3:
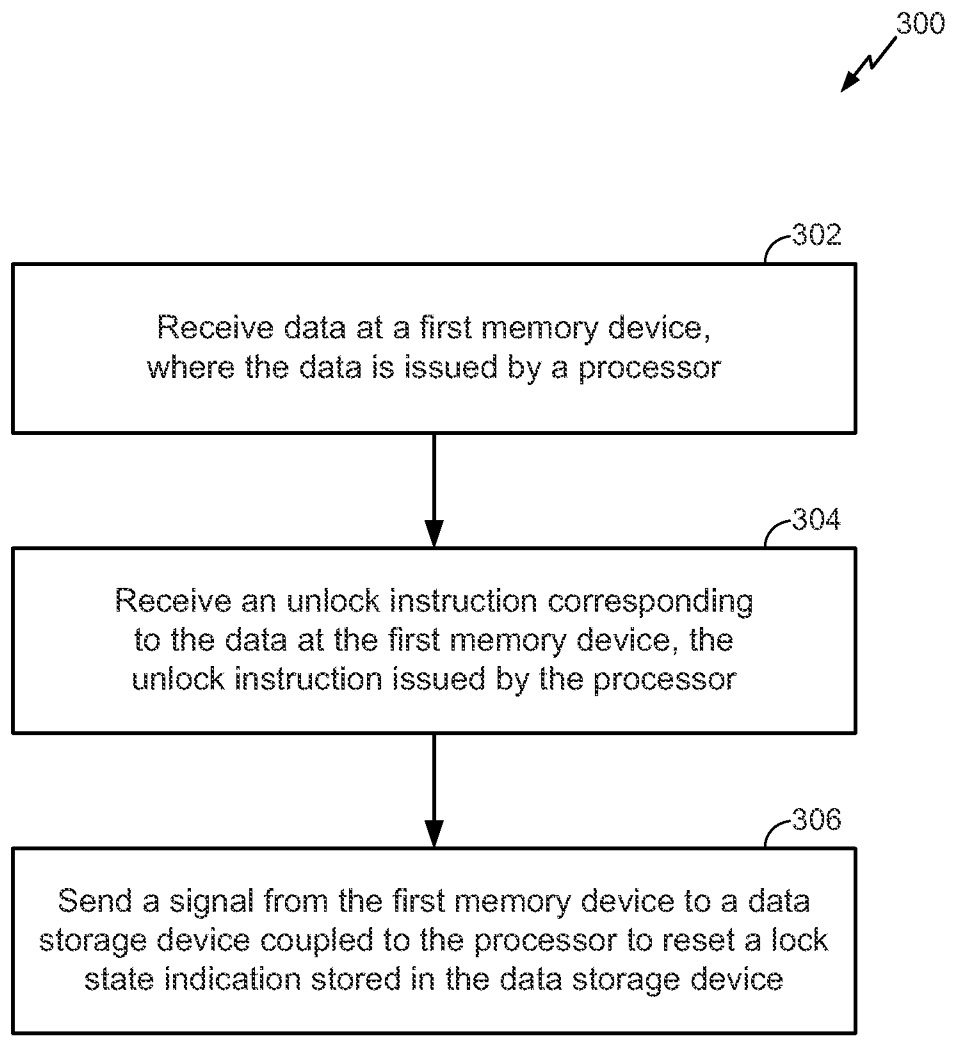
FIG. 3 is a flowchart to illustrate a particular embodiment of a method of resetting a lock indication.

Referring to FIG. 3, a flowchart of a particular embodiment of a method 300 of resetting a lock indication is shown. In an illustrative embodiment, the method 300 may be performed using the system 100 of FIG. 1 or the system 200 of FIG. 2.

The method 300 may include receiving data at a first memory device, at 302. The data may be issued by a processor. For example, the shared structure 110 (i.e., the first memory device) may receive modified data to replace the first set of data 142. The first core processor 102 may send the modified data to the shared structure 110 after performing processing functions on the first set of data 142.

An unlock instruction corresponding to the data may be received at the first memory device, at 304. For example, the shared structure 110 may receive the first unlock instruction 162 after the processing functions on the first set of data 142 are completed and after the modified data is received. The unlock instruction 162 may be issued by a processor, such as the first core processor 102.

A signal may be sent from the first memory device to a data storage device coupled to the processor to reset a lock state indication stored in the data storage device, at 306. For example, the shared structure 110 may send the first lock reset signal 164 to the register 112 (i.e., a data storage device) coupled to the first processor core 102 to reset the first lock state indication 152 stored in the register 112. Resetting the first lock indication 152 includes changing the bit value associated with the first lock indication 152 to correspond to the unlock state.

It will be appreciated that the method 300 of FIG. 3 may conserve power and/or improve efficiency of a processor after performing processing functions on a set of data by eliminating or reducing a stall time associated with the processor. For example, the first core processor 102 may perform additional processing functions after sending an unlock instruction to release the first lock rather than entering a stalled state while the modified data flows through the pipeline to the shared structure 110 and while waiting for a lock state to be changed in a register.

Figure 4:
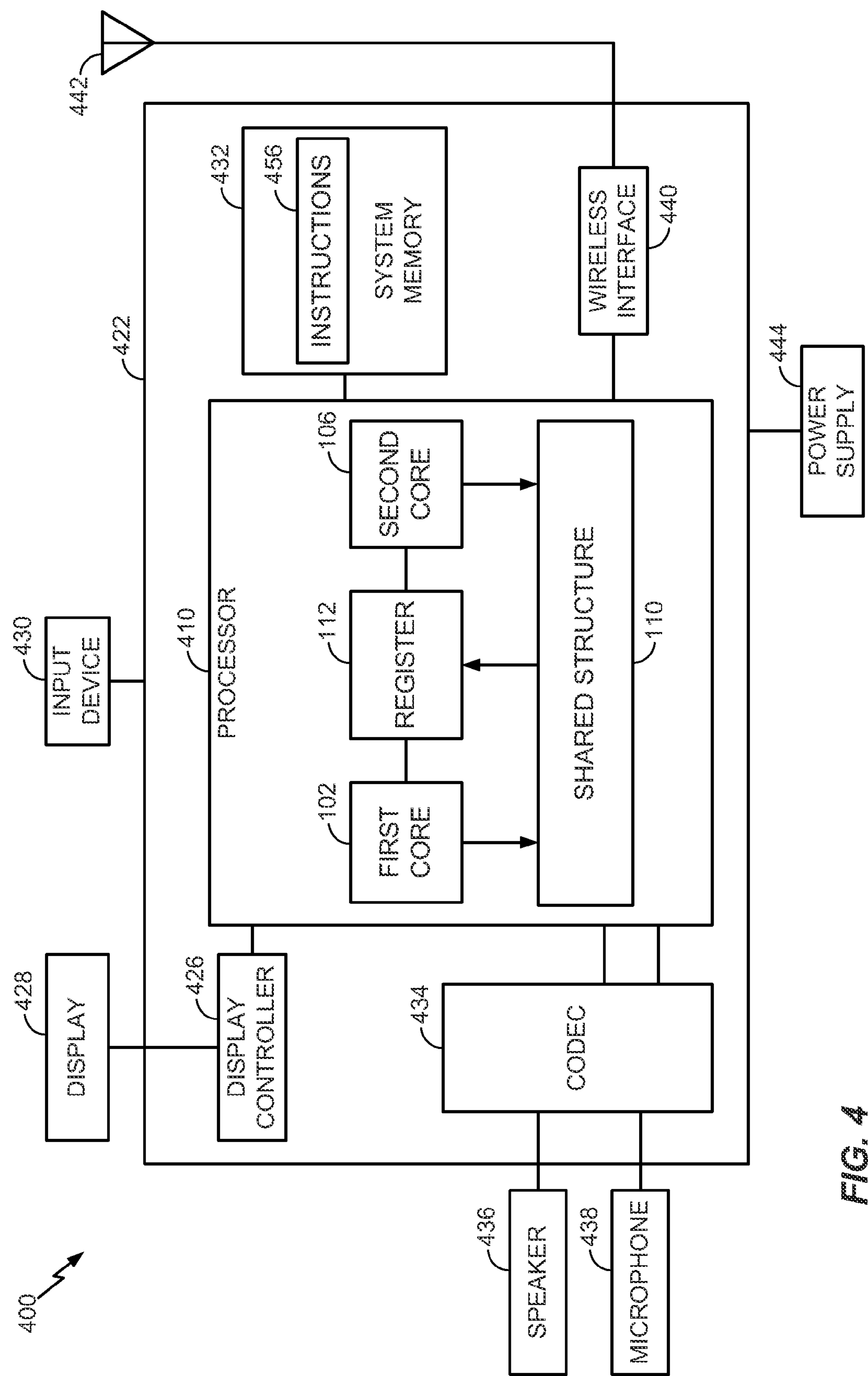
FIG. 4 is a block diagram of a wireless device including a multi-core processor system that is operable to reset a lock indication.

Referring to FIG. 4, a block diagram of a wireless device 400 including components operable to reset a lock indication is shown. The device 400 includes a processor 410, such as a digital signal processor (DSP), coupled to a memory 432. The processor 410 may be a multi-core processor and may include the first core processor 102, the second core processor 106, the shared structure 110, and the register 112 of FIG. 1. In a particular embodiment, the processor 410 may be configured to perform the method 300 of FIG. 3.

FIG. 4 also shows a display controller 426 that is coupled to the processor 410 and to a display 428. A coder/decoder (CODEC) 434 can also be coupled to the processor 410. A speaker 436 and a microphone 438 can be coupled to the CODEC 434. FIG. 4 also indicates that a wireless controller 440 can be coupled to the processor 410 and to a wireless antenna 442.

The memory 432 may be a tangible non-transitory processor-readable storage medium that includes executable instructions 456, The instructions 456 may be executed by a processor, such as the processor 410, to receive an unlock instruction issued by the first core processor 102 within the processor 410. The unlock instruction may correspond to the unlock instruction 262 of FIG. 2 and may be received at the shared structure 110 of the processor 410, The instruction 456 may also be executable to send a signal to a data storage device coupled to the first core processor to reset a lock indication stored in the data storage device. For example, the instructions may be executable to cause the shared structure 110 within the processor 410 to send a lock reset signal, such as the lock reset signal 264 of FIG. 2, to the register 112 within the processor 410 to reset a lock indication stored in the register 112.

In a particular embodiment, the processor 410, the display controller 426, the memory 432, the CODEC 434, and the wireless controller 440 are included in a system-in-package or system-on-chip device 422. In a particular embodiment, an input device 430 and a power supply 444 are coupled to the system-on-chip device 422. Moreover, in a particular embodiment, as illustrated in FIG. 4, the display 428, the input device 430, the speaker 436, the microphone 438, the wireless antenna 442, and the power supply 444 are external to the system-on-chip device 422. However, each of the display 428, the input device 430, the speaker 436, the microphone 438, the wireless antenna 442, and the power supply 444 can be coupled to a component of the system-on-chip device 422, such as an interface or a controller.

In conjunction with the described embodiments, an apparatus includes means for storing a lock state indication. For example, the means for storing the lock state indication may include the register 112 of FIGS. 1 and 2, the processor 410 programmed to execute the instructions 456 of FIG. 4, one or more other devices, circuits, modules, or instructions to store a lock state indication, or any combination thereof.

The apparatus may also include means for sending a signal to the means for storing based on receiving an unlock instruction, where a lock state indication in the means for storing is reset based on the signal. For example, the means for sending the signal may include the shared structure 110 of FIGS. 1 and 2, the processor 410 programmed to execute the instructions 456 of FIG. 4, one or more other devices, circuits, modules, or instructions to send a signal to the means for storing based on receiving an unlock instruction, or any combination thereof.

The apparatus may further include means for releasing a lock, where the unlock instruction is issued to the means for sending. For example, the means for releasing the lock may include the first processor core 102 of FIGS. 1 and 2, the second processor core 106 of FIGS. 1 and 2, the processor 410 programmed to execute the instructions 456 of FIG. 4, one or more other devices, circuits, modules, or instructions to release the lock, or any combination thereof.

The apparatus may further include means for performing other processing functions upon release of the lock and prior to the lock state indication being reset. For example, the means for performing the other processing functions may include the first processor core 102 of FIGS. 1 and 2, the second processor 106 of FIGS. 1 and 2, the processor 410 programmed to execute the instructions 456 of FIG. 4, one or more other devices, circuits, modules, or instructions to perform the other processing functions, or any combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus comprising:

a first core processor;

a lock register coupled to the first core processor; and a shared structure responsive to the first core processor, wherein the shared structure is responsive to an unlock instruction issued by the first core processor to send a signal to the lock register to reset a lock indication in the lock register, and wherein the first core processor is configured to perform processing functions after issuing the unlock instruction and prior to the lock register receiving the signal to reset the lock indication.

2. The apparatus of claim 1, wherein the lock indication includes a two-bit value of the lock register, the two-bit value corresponding to one of a lock state, an unlock state, or a reserve state.

3. The apparatus of claim 1, wherein the shared structure includes a level-two cache.

4. The apparatus of claim 1, further comprising:

a first level-one cache coupled to the first core processor and to the shared structure, wherein the first level-one cache is configured to:

receive memory operations associated with the unlock instruction from the first core processor;

receive the unlock instruction from the first core processor; and send the memory operations and the unlock instruction to the shared structure in a same order that the memory operations and the unlock instruction are received from the first core processor.

5. The apparatus of claim 1, further comprising a second core processor coupled to the lock register, wherein the shared structure is further responsive to a second unlock instruction issued by the second core processor to send a second signal to the lock register, and wherein each of the first core processor and the second core processor includes a bus queue.

6. The apparatus of claim 1, wherein the shared structure includes a memory and at least one of a memory bus or a system bus.

7. The apparatus of claim 1, wherein the unlock instruction is received by the shared structure after previously stored data of the first core processor has been received by the shared structure.

8. The apparatus of claim 7, wherein the shared structure corresponds to a coherence domain, wherein the unlock instruction is issued prior to results of memory operations being accessible by a second core processor in the coherence domain, the memory operations performed by the first core processor while the lock indication has a lock state associated with the first core processor.

9. The apparatus of claim 5, wherein the unlock instruction enables concurrent operations at the first core processor and the second core processor, wherein the lock register is separate from the shared structure, and wherein the first core processor is configured to access the lock register independently of the shared structure.

10. A method comprising:

receiving an unlock instruction at a memory device, the unlock instruction issued by a first processor; and sending a signal from the memory device to a data storage device coupled to the first processor to reset a lock state indication stored in the data storage device, wherein the first processor performs other processing functions after issuing the unlock instruction and prior to the data storage device receiving the signal.

11. The method of claim 10, wherein the data storage device is coupled to a second processor, and wherein the data storage device comprises an instruction based register.

12. The method of claim 10, wherein the unlock instruction from the first processor is received by the memory device after previously stored data of the first processor has been received by the memory device.

13. The method of claim 10, wherein resetting the lock state indication changes a bit value of the data storage device to indicate an unlock state.

14. The method of claim 10, wherein a second processor is responsive to the lock state indication while the first processor performs the other processing functions.

15. The method of claim 14, wherein the second processor stalls initiating processing functions on a set of data associated with the lock state indication when the lock state indication corresponds to a lock state.

16. The method of claim 10, wherein the unlock instruction is a command that communicates to the memory device that the first processor has completed processing functions associated with the lock state indication.

17. A non-transitory computer readable storage medium comprising instructions that, when executed by a processor, cause the processor to:

receive, at a shared memory of the processor, an unlock instruction issued by a first core processor;

send a signal to a data storage device coupled to the first core processor to reset a lock state indication stored in the data storage device; and perform other processing functions, at the first core processor, after issuing the unlock instruction and prior to the data storage device receiving the signal.

18. The non-transitory computer readable storage medium of claim 17, wherein the lock state indication includes a bit value of the data storage device and corresponds to one of a lock state, an unlock state, or a reserve state.

19. The non-transitory computer readable storage medium of claim 17, further comprising instructions that, when executed by the processor, cause the processor to release a lock, wherein releasing the lock includes the first core processor issuing the unlock instruction.

20. An apparatus comprising:

means for storing a lock state indication;

means for sending a signal to the means for storing responsive to receiving an unlock instruction, wherein the lock state indication stored in the means for storing is reset based on the signal;

means for releasing a lock; and means for performing other processing functions upon release of the lock and prior to the lock state indication being reset, wherein the unlock instruction is issued to the means for sending after the lock is released.

21. The apparatus of claim 20, wherein the means for releasing the lock and the means for performing the other processing functions each includes a first core processor, and wherein the first core processor is configured to perform the other processing functions prior to receipt of the signal by the means for storing.

22. The apparatus of claim 20, wherein the means for storing includes a register.

23. The apparatus of claim 20, wherein the means for sending includes a shared memory.

* * * * *